Patented Oct. 12, 1954

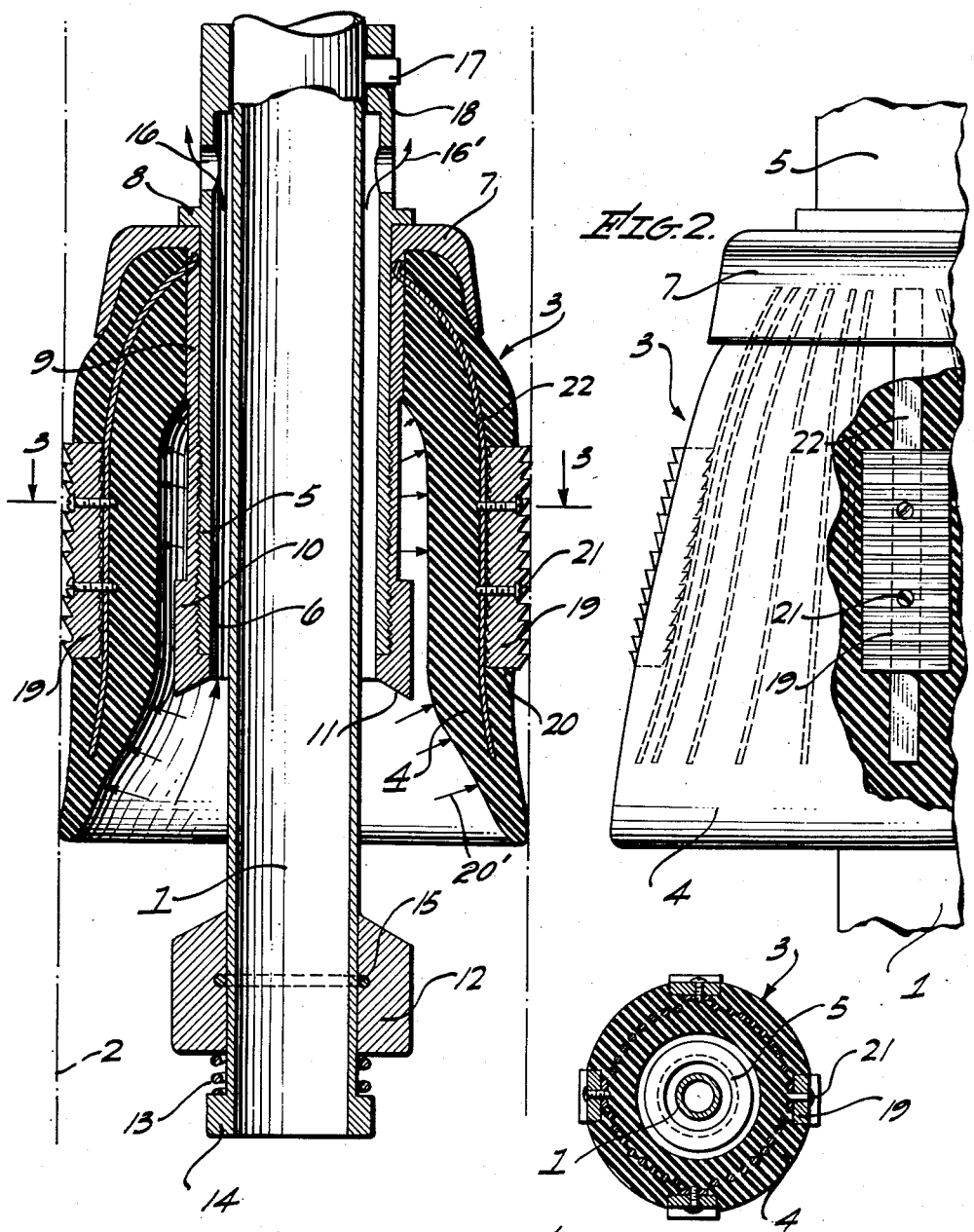

2,691,418

UNITED STATES PATENT OFFICE 2,691,418

COMBINATION PACKING CUP AND SLIPS

John A. Connolly, Long Beach, Calif.

Application June 23, 1951, Serial No. 233,205

5 Claims. (Cl. 166—129)

This invention relates to a combination packing cup and slips of the type used in oil wells, wherein the wall or casing engaging slips are mounted directly in the packing cup and are pressed against the casing or the wall of the bore by the resilience of the wall of the cup.

An object of my invention is to provide a packing cup with a wall engaging slip mounted directly in the wall of the cup and with the teeth of the slip protruding beyond the wall of the cup so that these teeth may engage the wall of the bore.

Another object of my invention is to provide a novel means of holding a packing cup in the bore of a well against longitudinal movement by means of slips which are mounted directly in the wall of the cup.

A feature of my invention resides in the manner in which the slips are mounted in the wall of the cup, such as the means to removably attach the slips in the wall of the cup.

Another object of my invention is to provide a combination of a packing cup and slips, thus eliminating the structure normally required to hold the slips adjacent to the cup, as well as the structures which were previously required to connect the packing cup and the slips.

Other objects, advantages and features of invention may appear from the accompanying drawing, the subjoined detailed description and the appended claims.

*In the drawing*

Figure 1 is a longitudinal sectional view of my combination packing cup and slips.

Figure 2 is a fragmentary side elevation of the same.

Figure 3 is a sectional view on a reduced scale taken on line 3—3 of Figure 1.

Referring more particularly to the drawing, the numeral 1 indicates a tube or pipe which is run into the bore 2 of the well and this bore may be either what is known as open drilled hole, or its usual casing or tubing. The packing cup 3 is mounted on the pipe 1 in the following manner:

The wall 4 of the packing cup is quite heavy and is preferably formed of rubber or synthetic rubber or plastic, and, therefore, will flex inwardly and outwardly under pressure, but normally the cup tends to flex outwardly so as to engage the bore 2 of the well. The cup 3 is fixedly mounted on a sleeve 5 and this sleeve is spaced from the pipe 1 to provide an annular fluid conduit 6 for purpose to be further described.

A thimble 7 on the upper end of the cup 3 bears against a shoulder 8 on the sleeve 5, thus limiting upward movement of the cup on the sleeve. A metal ring 9 is embedded in the wall 4 of the cup adjacent its upper end, and this ring is pressed against the thimble 7 and hold the thimble against the shoulder 8 by the nut 10 which screws on to the sleeve 5, substantially as shown. The nut 10 bears against the bottom of the ring 9 thus holding the cup 3 securely in position on the sleeve 5. The nut 10 may be integral with the ring 9 or these parts may be separate as desired. The lower end of the nut 10 is formed with a tapered seat 11, the purpose of which will be further described.

A valve 12 is mounted adjacent the lower end of the pipe 1 and is yieldably pressed upwardly by the spring 13, this spring bears against the bottom of the valve 12 and against a shoulder 14 on the bottom of the pipe 1. Thus, the valve 12 is yieldably held against the seat 11 when the pipe 1 is pulled upwardly relative to the cup 3.

A packing ring 15 is mounted in the valve 12 and bears against the outside of the pipe 1 to prevent leakage between the pipe and the valve. When the valve 12 is lowered, as shown in Figure 1, fluid can pass upwardly through the passage 6 and out through the ports 16 as indicated by the arrows 16' in Fig. 1, thus bypassing the cup 3 and permitting the cup assembly to move downwardly in the well, which is usually filled with fluid of one type or another.

When the tool is being run into the well, the valve 12 is held off of the seat 11 by means of a pin 17, extending into a J-slot 18, in the sleeve 5. This construction of a pin and J-slot is usual and well known in the oil well tool field and is frequently used to hold members in one position and permitting these members to be released when a certain point in the well bore is reached.

During many operations in an oil well, it is desirable to hold the cups 3 fixed in the bore of the well. Frequently there is gas pressure below the cups. To assist in holding these cups in position it is necessary that slips engage the bore of the well. For this purpose I provide a plurality of slips 19 which are mounted in suitable recesses 20 in the wall 4 of the cup. The slips 19 are fixedly held in position in the cup 3 and with the serrated surface protruding from the outer face of the cup, and I prefer that the slips 19 shall be removable. To this end, I provide a plurality of bolts 21 which extend through the slips and into a metal rib 22, which is embedded in the wall 4 of the cup 3. It will be evident that when the wall 4 of the cups flexes outwardly under pressure of gas as shown by the arrows 20' or under the natural flexing of the yieldable wall, then the slips 19 will engage the bore of the wall and hold the cup 3 against accidental longitudinal movement in the well.

In operation, the pin 17 is adjusted in its J-slot 18 so as to hold the valve 12 below its seat 11. The tool is now run into the well and the natural outwardly flexing of the wall 4 of the cup 3 will cause the slips 19 to drag slightly against the tubing or casing in the well. When it is desired to set the cup 3 in the well, a slight rotation of the pipe 1 will release the pin 17 and the pipe can then be pulled upwardly until the valve 12 rests on its seat 11. Fluid under pressure is now forced through the pipe 1 and this pressure fluid acting against the inner face of the wall 4 will expand the cup and will press the slips 19 tightly against the tubing or casing, thus effectively holding the cup 3 against accidental longitudinal movement. When it is desired to move the cup 3, the pipe 1 is lowered, thus moving the valve 12 off of its seat, pressure is then relieved from the inner face of the wall 4 and the cup 3, will slightly collapse, thus releasing the slips 19 from their tight engagement with the wall of the well and thereafter the cup 3 can be moved either upwardly or downwardly.

Having described my invention, I claim:

1. A combination packing cup and slip comprising a cup shaped packer having a wall, said packer being formed of a non-metallic resilient material, a slip block mounted in said wall, said slip having a toothed face projecting from said wall, a metal reinforcing rib mounted in the wall of the cup packer and means securing the slip to said rib.

2. A combination packing cup and slip comprising a cup shaped packer having a wall said packer being formed of a non-metallic resilient material, a pipe extending into the packing cup and having limited vertical movement therein, said packer having a fluid conduit extending vertically therethrough, and valve means on said pipe engageable with the lower end of the conduit to open and close the same on movement of the pipe relative to the cup packer, and a slip block mounted in the wall of the packing cup, said slip having a toothed face projecting from said wall, and means detachably mounting said slip in the wall of the cup packer.

3. A combination packing cup and slip comprising a cup shaped packer having a resilient wall, a pipe extending into the packing cup and having limited vertical movement therein, said packer having a fluid conduit extending vertically therethrough, and valve means on said pipe engageable with the lower end of the conduit to open and close the same on movement of the pipe relative to the cup packer, and a slip block mounted in the wall of the packing cup, said slip having a toothed face projecting from said wall, and means detachably mounting said slip in the wall of the cup packer, including a metal reinforcing rib mounted in the wall of the cup packer, and means securing the slip to said rib.

4. A combination packing cup and slip comprising a cup shaped packer having a wall said packer being formed of a non-metallic resilient material, a sleeve extending vertically through the packing cup, a pipe extending through said sleeve, said pipe having a limited vertical movement in the sleeve, said sleeve being of greater diameter than the pipe to form an annular fluid passage therebetween, a seat on the lower end of the sleeve, a valve on said pipe engageable with the seat to close said fluid passage, a slip block mounted in the wall of the packing cup, said slip having a toothed face projecting from said wall, and means detachably mounting said slip in the wall of the packing cup.

5. A combination packing cup and slip comprising a cup shaped packer having a resilient wall, a sleeve extending vertically through the packing cup, a pipe, said pipe and sleeve forming an annular fluid passage therebetween, means forming a seat on the lower end of the sleeve, a valve on said pipe engageable with the seat to close said fluid passage, a slip block mounted in the wall of the packing cup, said slip having a toothed face projecting from said wall, a metal reinforcing rib mounted in the wall of the packing cup, and means securing the slip to said rib.

References Cited in the file of this patent

UNITED STATES PATENTS

| Number | Name | Date |
|---|---|---|
| 2,009,198 | O'Connor | July 23, 1935 |
| 2,076,307 | Wells et al. | Apr. 6, 1937 |
| 2,159,640 | Strom | May 23, 1939 |
| 2,194,331 | Strom | Mar. 19, 1940 |
| 2,230,712 | Bendeler et al. | Feb. 4, 1941 |
| 2,241,561 | Spencer | May 13, 1941 |
| 2,331,185 | Gordy | Oct. 5, 1943 |
| 2,373,005 | Baker | Apr. 3, 1945 |
| 2,578,900 | Ragan | Dec. 18, 1951 |
| 2,652,894 | Brown et al. | Sept. 22, 1953 |
| 2,670,798 | Owen | Mar. 2, 1954 |

FOREIGN PATENTS

| Number | Country | Date |
|---|---|---|
| 448,083 | Great Britain | June 2, 1936 |